(12) United States Patent
Kulakov

(10) Patent No.: US 8,647,787 B2
(45) Date of Patent: Feb. 11, 2014

(54) GAS DIFFUSION ELEMENT, METHOD OF MANUFACTURING THE SAME, AND DEVICE USING THE SAME

(75) Inventor: Evgeny B. Kulakov, North York (CA)

(73) Assignee: Altek Capital, Inc., Brooklyn, NY (US)

( * ) Notice: Subject to any disclaimer, the term of this patent is extended or adjusted under 35 U.S.C. 154(b) by 1419 days.

(21) Appl. No.: 11/322,195

(22) Filed: Dec. 29, 2005

(65) Prior Publication Data

US 2007/0154776 A1    Jul. 5, 2007

(51) Int. Cl.
*H01M 8/00*    (2006.01)

(52) U.S. Cl.
USPC .......................................... 429/444; 429/440

(58) Field of Classification Search
USPC ................. 429/444, 450, 534, 535, 530, 440; 427/115; 502/101
See application file for complete search history.

(56) References Cited

U.S. PATENT DOCUMENTS

| 2002/0110726 A1* | 8/2002 | Busse et al. ...................... 429/44 |
| 2003/0232234 A1* | 12/2003 | Cisar et al. ...................... 429/38 |
| 2004/0157101 A1* | 8/2004 | Smedley ......................... 429/30 |
| 2008/0268297 A1* | 10/2008 | Quayle et al. ................... 429/12 |

* cited by examiner

*Primary Examiner* — Mark F Huff
*Assistant Examiner* — Monique Wills
(74) *Attorney, Agent, or Firm* — Henry M. Feiereisen, LLC

(57) ABSTRACT

A gas diffusion element has a hydrophobic layer which includes a thermoplastic material and particles embedded in the thermoplastic material so that the hydrophobic layer has voids and is a porous layer configured so that water can not pass through the hydrophobic layer from its one side to its another side, while passage of gas from the other side to the one side is not interfered with; and also a method of producing the gas diffusion element and devices using the gas diffusion element are proposed.

8 Claims, 12 Drawing Sheets

GAS DIFFUSION ELEMENT, METHOD OF MANUFACTURING THE SAME, AND DEVICE USING THE SAME

BACKGROUND OF THE INVENTION

The present invention generally relates to a gas diffusion element a method of manufacturing the same, and a device using the same.

More particularly, it relates to a gas diffusion element which can be used in gas diffusion electrodes for proton exchange membranes for fuel cells on membrane electrode assembly base and/or as a catalyst carrier of hydrogen generators/hydrogen convertors/hydrogen reformers, etc.

A complex structure of a gas diffusion electrode has not been produced in an integrated form and the art has relied on manual preparation of separate individual layers using expensive matrix materials such as polytetrafluoroethylene doped for hydrophobicity and expanded for porosity, together with precious metals for catalysis, and carbon for conductivity and a metal grid current collector. These layers are then bonded together to form the complex structure. Such prior art electrodes are expensive to produce, have failures at the layer junctions and do not provide good performance or utilization of the materials.

Production methods using hand-lay-up electrode rolling and catalyst addition or multiple hot press sinter stage production cannot become cost effective because of labor intensity and because of batch to batch variability. It is, therefore, essential that continuous production methods be developed which overcame the substantial production challenges, wherein the material costs must be low; the layers within the electrode structure must be integrated, and that the hydrophobic, catalyst and current collector sub-layers need to be optimized and not delaminate or degrade during use.

U.S. Pat. No. 4,058,482, issued Nov. 15, 1977, discloses a sheet material principally comprised of a polymer such as PTFE and a pore-forming material, wherein the sheet is formed of co-agglomerates of the polymer and the pore former. This patent teaches mixing polymer particles with positively charged particles of a pore former, e.g., zinc oxide, to form co-agglomerates thereof followed by mixing same with a catalyst suspension so as to form co-agglomerates of catalyst and polymer-pore-former agglomerates followed by pressing, drying, and sintering these co-agglomerates. Subsequent to this sintering, the pore former can be leached out of the electrodes. Thus, this teaching requires use of pore former agglomerates, which require subsequent leaching and not an integrated electrode structure.

U.S. Pat. No. 4,150,076, issued Apr. 17, 1979, is directed to a process for forming the sheet of aforesaid U.S. Pat. No. 4,058,482, and distributing same as a layer on a suitable electrode support plate, for example a carbon paper, to form a fuel cell electrode by a process which includes pressing, drying, sintering, and leaching. It discloses use of an electrode support plate such as carbon paper in addition to having the same limitations as U.S. Pat. No. 4,058,482.

U.S. Pat. No. 4,170,540 to Lazarz et al, issued Oct. 9, 1979, discloses a microporous membrane material suitable for electrolytic cell utilization, e.g., as a chlor-alkali cell separator, and formed by blending particulate polytetrafluoroethylene, a dry pore-forming particulate material, and an organic lubricant. These three materials are milled and formed into a sheet which is rolled to the desired thickness, sintered, and subjected to leaching of the pore-forming material. The electrode contains no active carbon and does not function as a catalytic or active layer in an electrode. The microporous layer will not be conductive and, hence, would not permit easy electron transfer through the layer.

U.S. Pat. No. 4,152,489, issued May 1, 1979, describes air electrode structures consisting of a metal grid active material such as acetylene black carbon and catalyst with porous sintered polytetrafluoroethylene require considerable force to combine these materials into a single structure. The force collapses the pores and reduces pore volume and hence reduces active catalyst loading area. It described "a multi-layer hydrophilic section, consisting of at least two substantially uncompacted laminated layers of plaques containing loaded, catalytically active battery material; each loaded plaque consisting of a 75% porous to 95% porous metal current collector to put more catalyst into the pore structure by preparing the metal grid with catalyst before pressing.

U.S. Pat. No. 4,354,958, issued Oct. 19, 1982, described an improved fibrillated matrix-type active layer having improved strength and durability so as to avoid mechanical failure during use. The process for forming this structure is complex. Components are shear-blended, dried, chopped into fine form and then rolled. Carbon black particles are combined with an aqueous dispersion of polytetrafluoroethylene (PTFE) and are then dried before combining with active carbon and finally forming the layer.

U.S. Pat. No. 4,459,197, issued Jul. 10, 1984, describes a laminated electrode with an active layer, a current distributor and a hydrophobic layer wherein the active layer has a carbon black with a surface area of 20 to 1500 square meters per gram. The electrodes described do not require fillers to make the layers porous. Discussion is made of prior art with reference to the electrodes having poor mechanical strength. Use of aforesaid U.S. Pat. No. 4,354,958 as an active layer is described.

U.S. Pat. No. 4,500,647, issued Feb. 19, 1985, describes the preparation of a 3 layer laminated matrix which uses carbon particles in a PTFE layer prepared from an aqueous dispersion, drying, then blending the material with active carbon before producing an active layer which is laminated to a collector and a hydrophobic wetproof layer. The 3 layers are not integrated, PTFE is required which is expensive, the development of pore structure is not included and the active layer is laminated to a current distributor.

U.S. Pat. No. 4,514,474, issued Apr. 30, 1985, describes an air electrode having an active layer with a collector grid on one side and a porous nonconductive separator on the other. The nonconductive separator is described as porous polypropylene. The grid and separator are permanently bonded to the active layer and the polypropylene was preselected with porosity. The layers are not integrated, nor can the porosity in the nonconductive separator be developed. The non-conductive porous separator has a disadvantage by not providing a structure for oxygen reduction and electron capture.

U.S. Pat. No. 4,518,705, issued May 21, 1985, describes the preparation of a 3 layer laminated electrode using a technique similar to U.S. Pat. No. 4,500,647, and has the same limitations.

U.S. Pat. No. 4,568,442, issued Feb. 4, 1986, describes a 2 layer composite gas diffusion electrode with an active layer and a backing layer. The active layer is porous, homogeneous and hydrophilic containing hydrophobic coated particulate matter with a catalyst. The active layer is prepared in two parts with the first having a liquid dispersion medium and the second being a prepared dried precipitate which is then shear blended with the first part before calendaring and sintering. It is only a 2-layer structure requiring multistep preparation of materials for the active layer. The active layer is a homogeneous type layer requiring precious metal catalysts and which is bonded to the backing layer. The drying of one part of the active layer before blending with the thermoplastic halocarbon binder and other components such as catalysts is time and energy costly. There is no direction on how to provide an integratable structure and make the bond between the two materials strong.

U.S. Pat. No. 4,602,426, issued Jul. 29, 1986, describes a method of producing a gas diffusion electrode using a series of dry mixtures comprising a hydrophobic agent, a variety of catalyst concentrations and a pore forming agent which are layered on an electrically conductive current collector and then pressed to form an electrode and then leached to produce pores. It does not produce an integrated structure. The dry mixtures are difficult to handle and homogenize, pressing does not produce an integratable structure, the collector is not integrated into the structure but is a separate layer which can be anticipated to have bonding failure at the interface because of different coefficients of thermal expansion.

U.S. Pat. No. 4,636,274, Jan. 13, 1987, describes the formation of a gas depolarized electrode with a carbonized ribbed porous structure, a press molded fluorocarbon layer and an oxygen catalyzing layer. The layer is claimed to be leakage resistant to 3 psi internal pressure. This reference does not teach integration of parts or development of the carbon catalyst active layer in the current invention.

U.S. Pat. No. 4,696,872, issued Sep. 29, 1987, describes the use of a 3 step process to produce a catalytic layer for a fuel cell which involves separately combining two different carbons with binders and then blending these binders and then forming a single layer. It makes use of the different properties of carbon particles but does not teach how to optimize the performance of the two types of carbon but uses a blending of the polymer-coated carbons. It does not describe how to generate porosity in the active layer to allow efficient oxygen ingress or how to produce an air electrode structure, only an active layer.

U.S. Pat. No. 4,737,257, issued Apr. 12, 1988, describes an electrode having a conductive carbon fiber current collector but not how to produce an integrated complex electrode structure.

U.S. Pat. No. 4,877,694, issued Oct. 31, 1989, describes an air electrode having extended performance at high current density having gas porous hydrophobic layer, a hydrophilic halogenated polymer binder with catalyzed carbon particles and particulate bound with hydrophobic polymer which can be pressed onto a carbon paper and supporting metal mesh. It does not describe an integrated structure. The current collector is a pressed layer subject to resistance loses and contact failures with the air electrode. The device uses expensive halogenated polymer binding.

U.S. Pat. No. 4,885,217, issued Dec. 5, 1989, describes an air electrode comprising a sheet-like laminate including (a) first and second layers having opposed major surfaces respectively exposed for contact with a liquid electrolyte and with air, said layers also having facing major surfaces, and said second layer being permeable to air but not to said liquid electrolyte; and (b) current-collecting means in contact with said first layer and connectable to external electrical circuitry; wherein the improvement comprises (c) said first layer comprising a nonwoven fibrous web impregnated with a mixture of carbon particles and a nonfibrous polymeric substance for holding the carbon particles in the web; and (d) said facing major surfaces of said first and second layers being bonded together by heat seal coating material distributed on said facing major surfaces in such manner as to provide an array or network of areas free of coating material extending substantially uniformly thereover. This air-electrode requires a heat sealing coating material which causes blockage of the hydrophobic and hydrophilic layers and ultimate failure of the bond during use.

U.S. Pat. No. 4,906,535, issued Mar. 6, 1990, describes the use of carbon fibers and carbon particles in an air electrode and is a continuation of U.S. Pat. No. 4,885,217.

U.S. Pat. No. 5,312,701, issued May 17, 1994, describes a process for preparing a single pass gas diffusion electrode by a wet filtration technique to collect catalyzed carbon black, hydrophilic fluorinated polymer and a particulate fluorinated polymer from a liquid. A second layer with different properties can be filtered on top of the first. Through the wet filtering there is some mixing of the layers. Sintering is then used to create a single structure. A conductive metal mesh collector can be incorporated in the sintering process which is carried out above 270° C. The intermixing of the wet filtration layers and the single pass production are stated to be advantages in that delaminating is reduced because of the intermixing zone and only a single process step is required to create the two layers. However, there is a need for an improved air-electrode having enhanced longer life dimensional stability made from low cost materials by low cost production without the use of precious metals or expensive fluorinated polymers.

SUMMARY OF THE INVENTION

Accordingly, it is an object of the present invention to provide a gas diffusion element of the above mentioned general type, which eliminates the disadvantages of the prior art and is a further improvement thereof.

It is also an object of the present invention to provide a gas diffusion element which has a low cost and at the same time exhibits an effective performance in corresponding devices.

It is a further object of the present invention to provide a gas diffusion element of the above mentioned general type, which ensures a quality gas flow (air, oxygen and hydrogen) to a reactive area from the composite material, having enhanced dimensional stability, longer life, and increased electrochemical performance.

In keeping with these objects and with others which will become apparent hereinafter, one feature of the present invention resides, briefly stated in a gas diffusion element, comprising a hydrophobic layer which includes a thermoplastic material, particles embedded in the thermoplastic material so that said hydrophobic layer has voids and is a porous layer configured so that water can not pass through said hydrophobic layer from its one side to its another side, while passage of gas from the other side to the one side is not interfered with, and a catalyst.

In accordance with a further feature of the present invention, a method is proposed for producing a gas diffusion element; comprising the steps of forming a hydrophobic layer including a thermoplastic material with particles embedded in the thermoplastic material so as to form said hydrophobic layer porous with voids so that water can not pass through said hydrophobic layer from its one side to its another side, while passage of gas from the other side to the one side is not interfered with, and with a catalyst.

Finally, a device is proposed, operating with a gas diffusion, comprising a gas diffusion element including a hydrophobic layer which includes a thermoplastic material particles embedded in the thermoplastic material so that said hydrophobic layer has voids and is a porous layer configured so that water can not pass through said hydrophobic layer from its one side to its another side, while passage of gas from the other side to the one side is not interfered with, and a catalyst.

When the gas diffusion element is designed, the method of producing of the gas diffusion element is performed, and a device is designed in accordance with the present invention, they essentially provide significant improvements over the elements, methods disclosed in the prior art.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
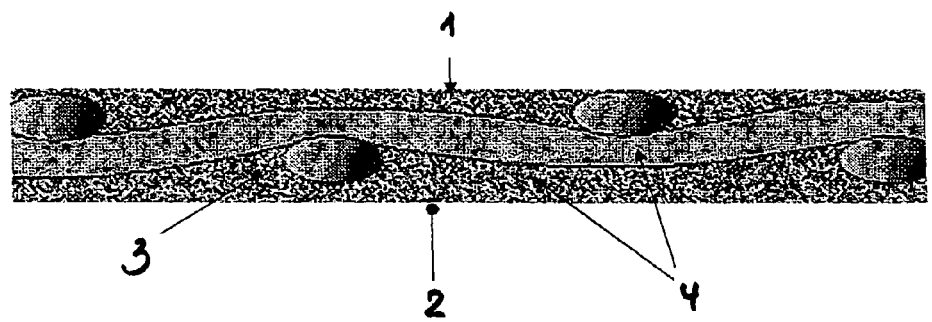
FIG. 1 is a view schematically showing a cross-section of a one layer gas diffusion element in accordance with the present invention.

In accordance with the present invention, a gas diffusion element is proposed which can be used in various gas media and in various devices, such as for example fuel cells, hydrogen generators/convertors/reformers, etc.

The gas diffusion element in accordance with the present invention can be formed as a one-layer gas diffusion element. In this case the gas diffusion element has a hydrophobic layer which includes a thermoplastic material and a plurality of particles embedded in the thermoplastic material, so that the gas diffusion element has sufficient voids such that water can not pass through the hydrophobic layer from its one side to its another side, while passing of gas from the other side to the one side is not interfered with, and a catalyst is provided.

The basic material is the thermoplastic material which can be for example polyethylene and polypropylene. The particles covered by the thermoplastic material can be formed for example by non-activated carbon or carbon black. A catalyst is provided, for example for reduction of hydrogen gas to proton ion when the gas diffusion element is used as a gas diffusion anode and oxygen to water on the gas diffusion cathode, on another side of the proton exchange membrane. Particles composed of the activated carbon can also form a catalyst.

The ratio of the embedded particles to the thermoplastic material provides a corresponding hydrophobicity of the gas diffusion element. The porosity is formed due to combination of physical sizes of particles of activated carbon (5-10 μm), non-activated carbon or carbon black (0.01-1.0 μm) and channels formed by the polyethylene binder, while the channels are formed as a result of washing out of industrial oil, in which initially polyethylene was somewhat diluted.

The one-layer gas diffusion element can be formed as a sheet produced by extrusion. It can have a width up to 10 dm, preferably up to 5 dm, and in particular 1 dm which is determined by dimensions of extrusion head; a length up to 1000 dm, preferably up to 10 dm, and in particular 5 dm, which is determined by a length of a current-conductive mesh and sizes of receiving drum for winding of the extrusion-produced gas diffusion element in form of a ribbon; and a width from 0.01 to 10 mm, preferably to 1 mm, and in particular 0.3 mm determined by a height of a slot of the extrusion head and a distance between rollers of a rolling mechanism.

In one example the one-layer gas diffusion element can include for example a high density polyethylene, polyisobutilen, industrial oil, activated carbon, non activated carbon or carbon black, and a catalyst based on noble metals or non-noble metals and their derivatives.

The activated carbon can be provided in the quantity of 0.5-95 weight percent, preferably 1.5-20% and in particular in the given example 5%. It performs the functions of a non-noble inexpensive catalyst. It is mainly used for reduction of oxidizing agents, such as oxygen and chlorine, including catalization of all intermediate stages of sorption of molecules on the surface of the gas diffusion element, dissociation of molecules into atoms, ionization of atoms and in particular reduction. It also performs the function of additional formation of sizes of phobic pores (small size pores approximately 1-10 µm) due to sizes, formed between connected prizmoidal particles which loosen the porous structure to the necessary parameters.

Non-activated carbon (carbon black) can be used in the quantity of 0.5-95 weight percent, preferably 1.5-90 weight percent and in this particular example 85 weight percent. It performs the functions of forming electrically conductive properties, forming properties of non-wetting of walls of pores, and forming sizes of phobic pores of small size approximately 0.5-1 µm due to sizes, formed between a connected spheroidical particles.

The catalyst can be based on noble metals such as Pt, Pd, Ru, Au and also Co, Ni, Cu, and their alloys, in the quantity of 0.01-1.0 mg/cm$^2$, preferably 0.1-0.5 mg/cm$^2$, and in this example 0.25 mg/cm$^2$. The catalyst can be also based on non-noble elements and their derivatives, including activated carbon, macroheterocyclic structures based on pyrocarbon, spinel, for example based on nickel in the quantity of 0.01-50 mg/cm$^2$, preferably 1-10 mg/cm$^2$, and in this example 3-5 mg/cm$^2$.

Both types of catalysts are provided for acceleration of processes of reduction of fuel, for example nitrogen in the case of proton exchange membrane fuel cells, including catalization of all intermediate stages of sorption of molecules on the surface of the gas diffusion element, dissociation of molecules into atoms, ionization of atoms, and oxidation and reduction, for example in accordance with the following formula.

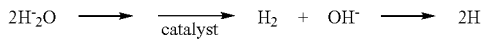

$$2H^-_2O \xrightarrow{\text{catalyst}} H_2 + OH^- \longrightarrow 2H$$

The catalyst can be introduced into the composition of the gas diffusion element during the process of production of the gas diffusion element, and also after the production of the gas diffusion element by a process of natural cathodic reduction from solutions that contain salts of catalysts, for example PtCr$^2$, due to difference of potentials between the surface of the gas diffusion element and the catalyst (Pd, Ru, Au, Ag, Rh and also Co, Ni, Cu) in a solution.

High density polyethylene can be used as a binder for imparting to the gas diffusion element necessary mechanical properties and simultaneously improving the non-wetting properties (phobicity due to chemical properties of polyethylene).

Industrial oil are utilized for some dilution of polyethylene in order to obtain a homogenous mixture of a dough-consistency. Polyisobutilen is used for forming the properties of plasticity and resistance of the product to the action of various climate factors, including ultraviolet radiation, during the process of utilization of the product. The thermoplastic compound of high density polyethylene can be used, which is produced by Sigma Aldrich, USA., the activated carbon can be used which is produced for example by Calgon Carbon Corporation, non activated carbon can be used which is produced by Cabot Corporation, USA, the inert liquid carrier or liquid mineral oil can be paraffin produced by Mallintkrodt Lab. Chemicals, polyisobutalene rubber can be used which is produced Sigma Aldrich, USA.

The components taken in the quantity specified herein above, are mixed, so that first high density polyethylene is mixed with the industrial oil, then polyisobutylene is added, and then non activated carbon preliminarily mixed with activated carbon are introduced. The mixture is heated to a temperature of approximately 0.8 of temperature of melting of high density polyethylene (approximately 100°-140° C.), it is then supplied for example by a screw or piston device into a slotted extrusion head, together with a current-conductive mesh which for example is unwound from a roll, and before supplying into the extruding head the mixture is passed through a vacuum degassing device in order to eliminate residual gasses from the process of interaction of high density polyethylene with the industrial oil.

A ribbon of material is produced after the extruder, which is saturated with oil, and is cut into sheets of required sizes. It is then introduced into an oil extractor formed for example as a bath with a mixer, containing a solution of for example carbitol and the like at temperature 0.8 of boiling temperature of approximately 80° C. during 0.1-24, preferably 1-10 and in particular in this example two hours, so as to extract oil from the gas diffusion element. After this extraction the sheets are rolled on a polishing calandering rolls to a desired thickness and conveyed to drying under atmospheric conditions for 10-100 hours, preferably 15-50 hours and in particular example 24 hours until the weight of the samples does not change anymore. The thusly produced gas diffusion elements are ready for use.

FIG. 1 is a view showing a transverse cross-section of a one-layer gas diffusion electrode in accordance with the present invention. Reference numeral 1 identifies a side of gas supply (for example oxygen/air, nitrogen and chlorine, while reference numeral 2 identifies a side facing a zone of an electrochemical reaction and more particularly electrolyte formed for example by a proton exchange membrane or aqueous solutions of alkali and acid, for example HCl. Reference numeral 3 identifies the body of the electrode composed of polyethylene, polyisobutylene and carbon components, and having a porous structure. Reference numeral 4 identifies a current-conductive mesh.

Figure 2:
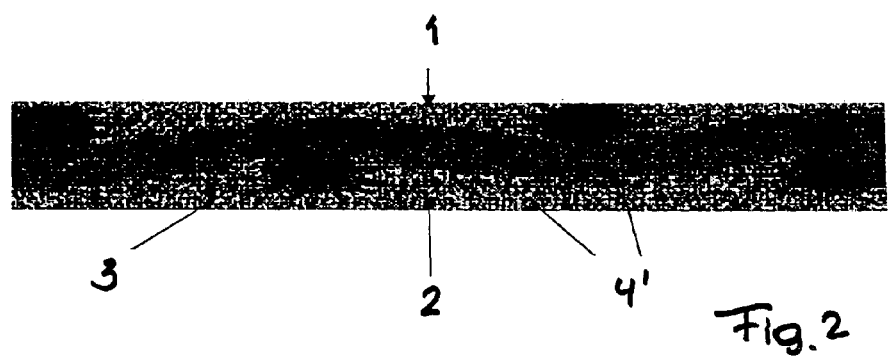
FIG. 2 is a view substantially corresponding to the view of FIG. 1 but showing the one layer gas diffusion element with a dendrite structured mesh.

FIG. 2 is a view substantially corresponding to the view of FIG. 1. However, the current-conductive mesh 4' is formed as a dendrite or rough structure, in order to improve electrical contact with carbon matrix of the electrode.

Figure 3:
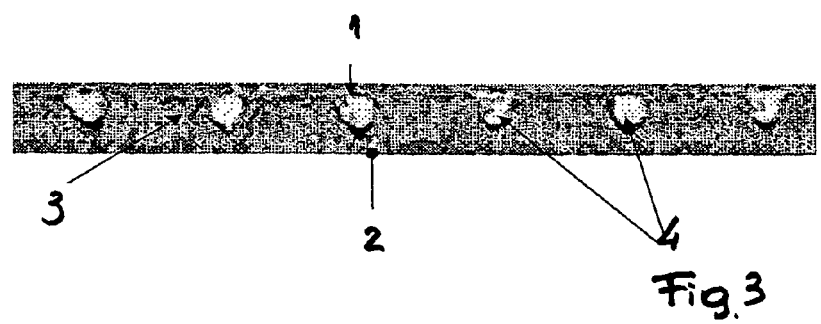
FIG. 3 is a view showing a cross-section of the actual produced one layer gas diffusion element in accordance with the present invention.

FIG. 3 is a view showing a photograph of a cross-section of a real electrode produced in accordance with the schematic view of FIG. 1.

Figure 4:
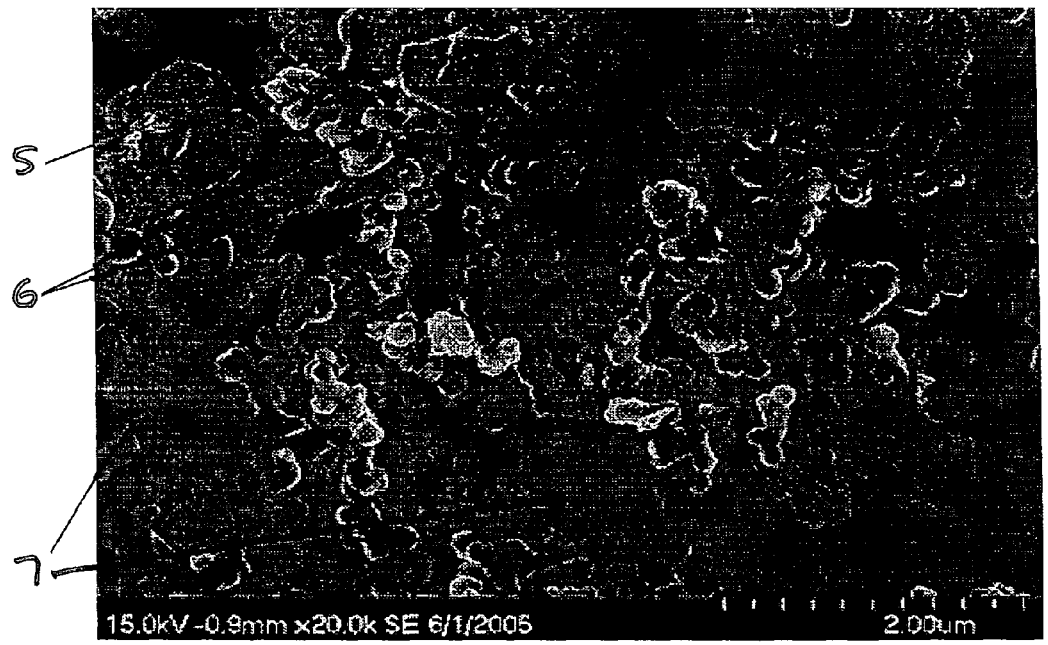
FIG. 4 is a microscope view of a non-catalyzed one layer gas diffusion element in accordance with the present invention.

FIG. 4 is a view showing a photograph of a microstructure of a one-layer non catalyzed gas diffusion electrode, made with an electron microscope, in which the location of activated carbon particles 5, non activated carbon particles 6 and a binder including polyethylene and polyisobutylene 7 can be clearly seen.

Figure 5:
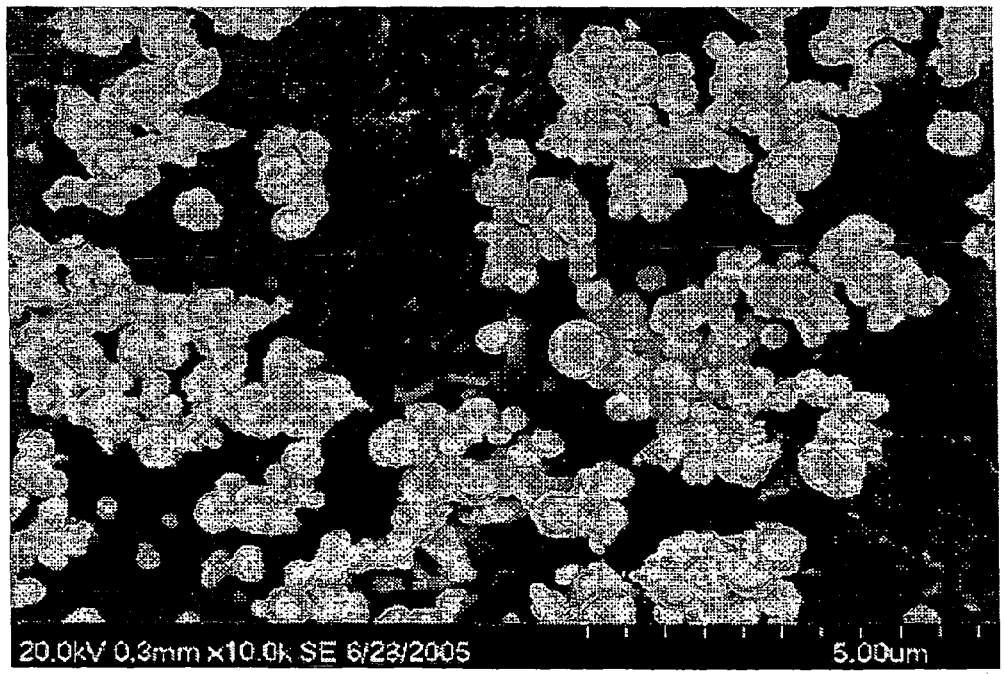
FIG. 5 is a microscope view of platinum catalyzed one layer gas diffusion element.
Figure 6:
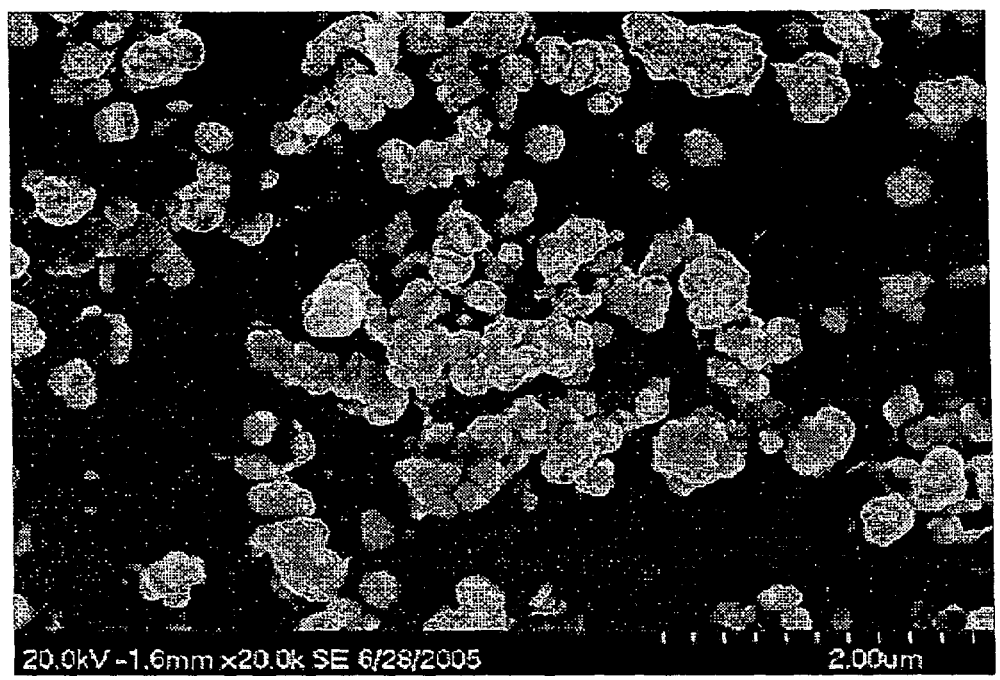
FIG. 6 is a microscope view showing a platinum and palladium catalyzed one layer gas diffusion element in accordance with the present invention.
Figure 10:
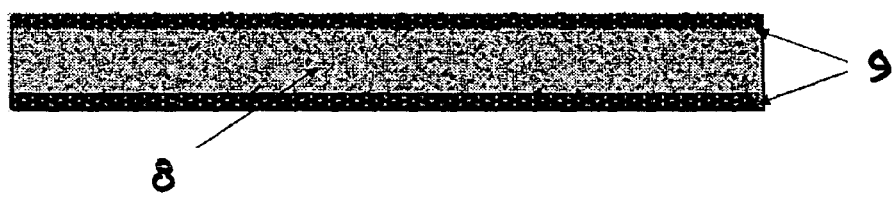
FIG. 10 is a view schematically showing a hydrogen-air fuel cell with the use of the one-layer gas diffusion element in accordance with the present invention.
Figure 7:
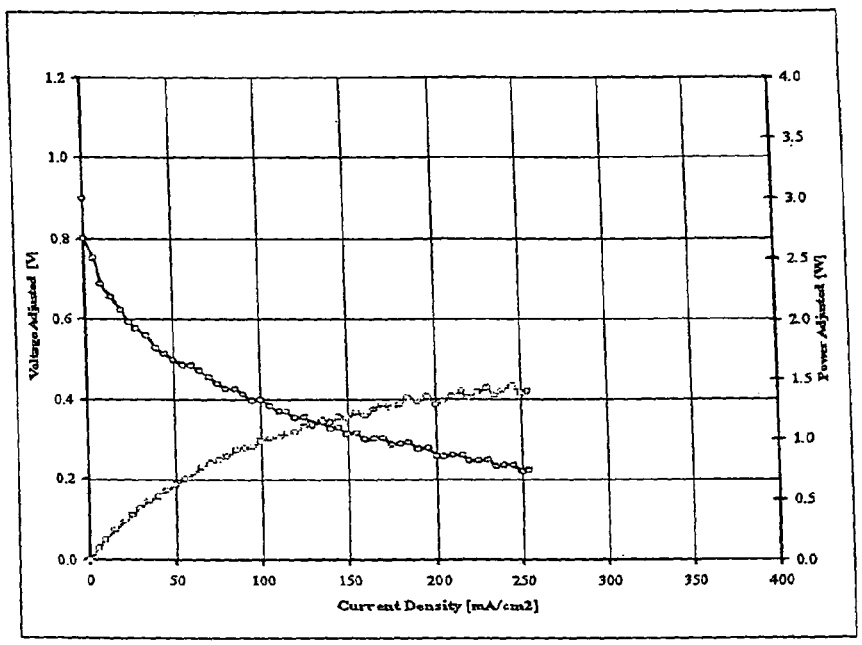
FIG. 7 is a view showing a dependency of voltage and power from a current density for proton exchange membrane fuel cell produced by DuPont.
Figure 8:
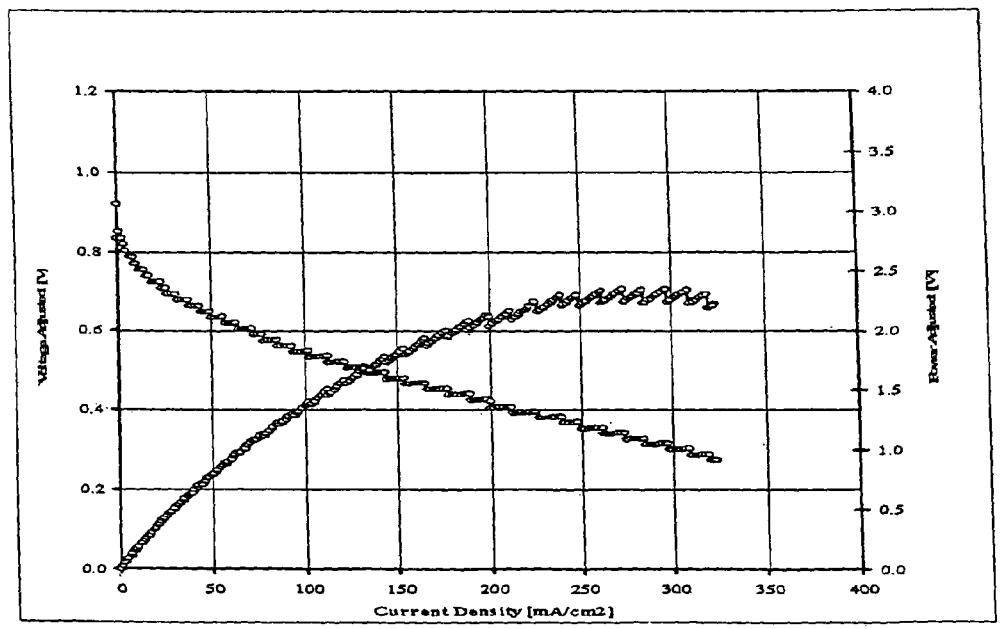
FIGS. 8 and 9 are views showing dependency of voltage and power from current density for proton exchange membrane fuel cells with catalized and non catalized one layer gas diffusion element in accordance with the present invention.
Figure 9:
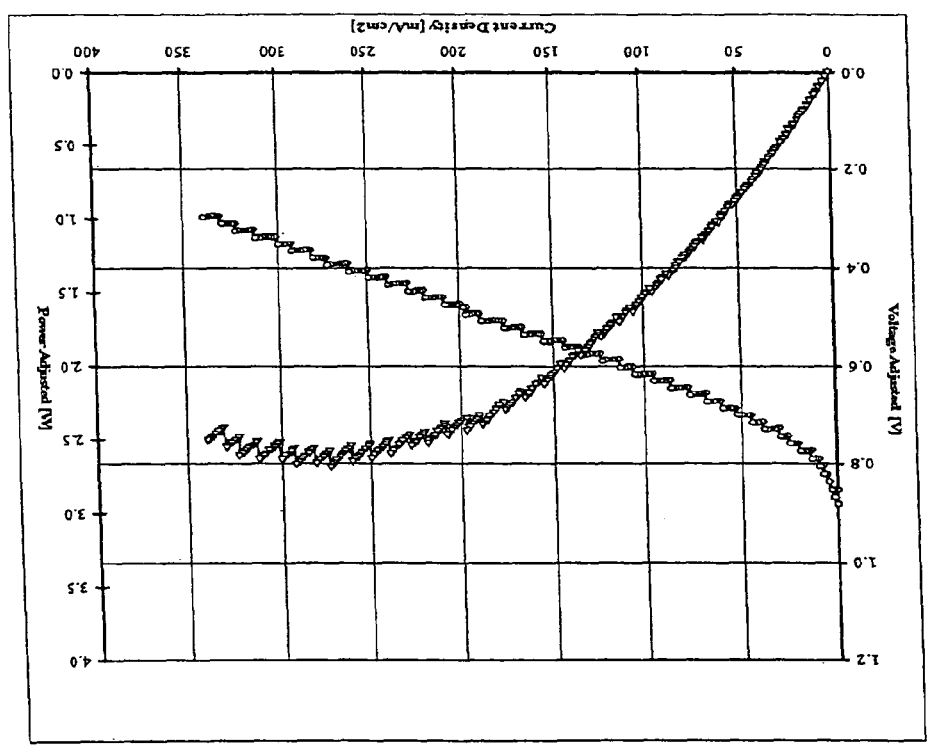

In FIG. 5 is a view showing an electron microscope photograph of a microstructure of the one layer gas diffusion element which is catalyzed with platinum, wherein spheroids and atolls of gray color illustrate the platinum catalyst in the structure of the electrode;

FIG. 6 is a view showing an electron microscope photograph of a microstructure of the one-layer gas diffusion electrode, which is catalyzed with platinum and palladium with ratio 1:1;

FIG. 7 is a view showing a dependence of voltage and power from a current density for proton exchange membrane fuel cell produced by DuPont and showing how much power can be obtained from a unit surface of an electrode and with which voltage;

FIGS. 8 and 9 show the dependency of voltage and power from current density for proton exchange membrane fuel cell for non-catalyzed and catalyzed gas diffusion electrodes in accordance with the present invention;

FIG. 10 shows a one-layer gas diffusion element in accordance with the present invention, without a current collecting mesh, which includes the body 8 of polyethylene, polyisobutylene, carbon components and is porous, while reference numeral 9 identifies catalyst layers adjoining the body.

Figure 11:
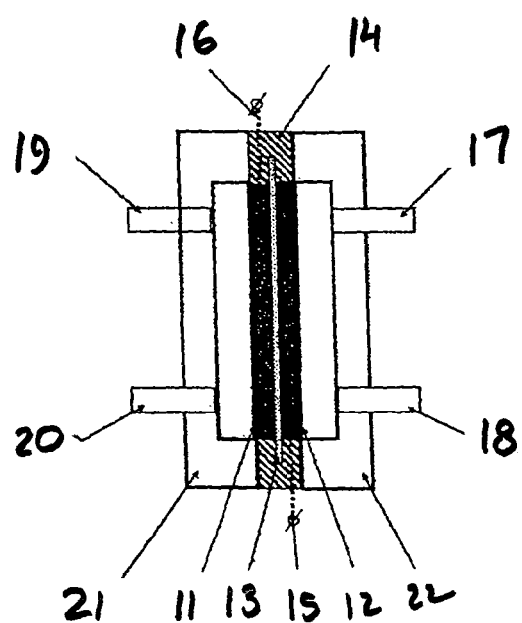
FIG. 11 is a view schematically showing a hydrogen-air fuel cell with gas diffusion elements in accordance with the present invention.

FIG. 11 is a view schematically showing a hydrogen-air fuel cell with gas diffusion elements in accordance with the present invention. Reference numeral 11 identifies a gas diffusion cathode which is a positive electrode on an air/oxygen side and formed as the gas diffusion element in accordance with the present invention; reference numeral identifies a gas diffusion anode which is a negative electrode on hydrogen side and composed of the gas diffusion element in accordance with the present invention, and reference numeral 13 identifies a proton exchange membrane between the cathode and anode and formed as an ion conductive medium for proton ions. The fuel cell further has a sealant 14, an anode electric bus 15, a cathode electric bus 16, oxidizer gas (air) inlet and outlet supply elements 17 and 18, reducer gas (hydrogen) inlet and outlet supply elements 19 and 20, and a body composed of elements 21 and 22.

The gas diffusion element can be formed as a two-layer element. In this case in addition to the one-layer gas diffusion element, it is provided with an additional layer formed as a hydrophilic layer. When in contrast to a solar-polymer proton exchange membrane there is a liquid electrolyte, it is necessary to impart hydrophilic properties to a surface of the electrode facing such an electrolyte, so that it is capable to absorb electrolyte and to provide its supply into the zone of electrochemical reaction. In the case of the two-layer electrode, this zone is located inside the electrode at a border of three phases.

Figure 12:
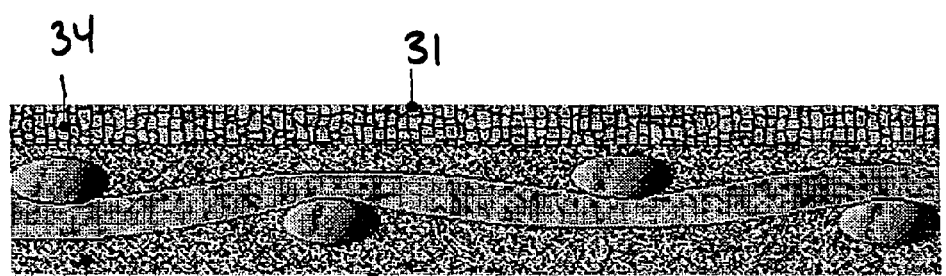
FIG. 12 is a view schematically showing a cross-section of a two-layer gas diffusion element in accordance with the present invention.

FIG. 12 shows a cross-section of the two layer gas diffusion element. It has an electrolyte side 31 and a gas side 32, a hydrophobic layer 33 which is similar to the one-layer gas diffusion element, and an additional hydrophilic layer 34 at the electrolyte side 31.

The hydrophilic layer can be produced by a coextrusion of the one-layer gas diffusion element with the hydrophilic layer. The two-layer gas diffusion element can be used for example as a gas diffusion cathode for alkaline fuel cell, i.e. aluminum air and/or gas diffusion anode for direct methanol proton exchange membrane fuel cells.

Figures 13A, 13B:
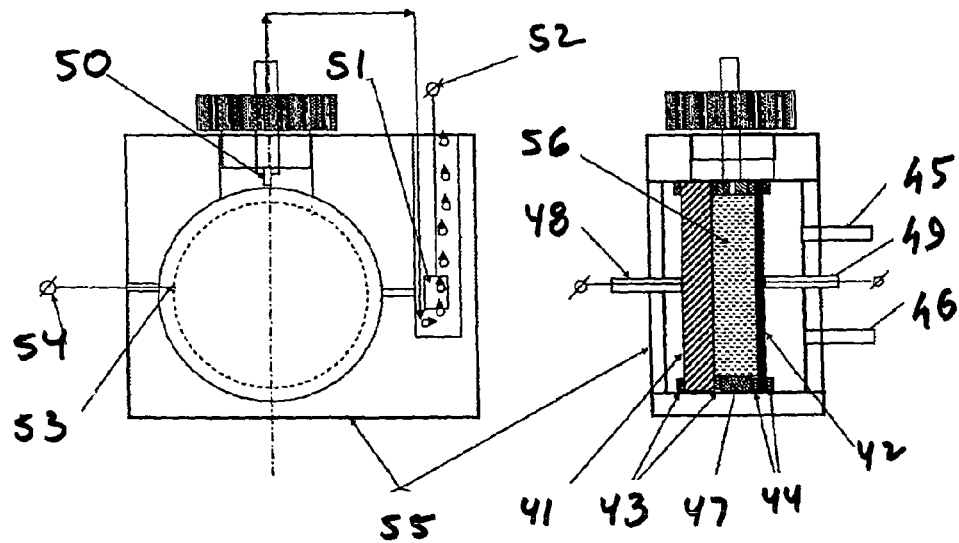
FIGS. 13a and 13b are views showing an aluminum air fuel cell with the two-layer gas diffusion element in accordance with the present invention.

FIGS. 13a, 13b schematically show an aluminum-air fuel cell. It has a metal (aluminum) circular anode plate 41, a circular gas diffusion electrode 42, an anode gasket 43, a cathode gasket 44, air inlet/outlet supply members 45 and 46, a spacer 47, an anode electrical bus 48, a cathode electrical bus 49, a hydrogen ventilation hole 50, a reference electrode 51, a reference electrode electrical contact 52, a thermocouple 53, thermocouple electrical contacts 54, a cell body 55, and an electrolyte 56.

Figure 14:
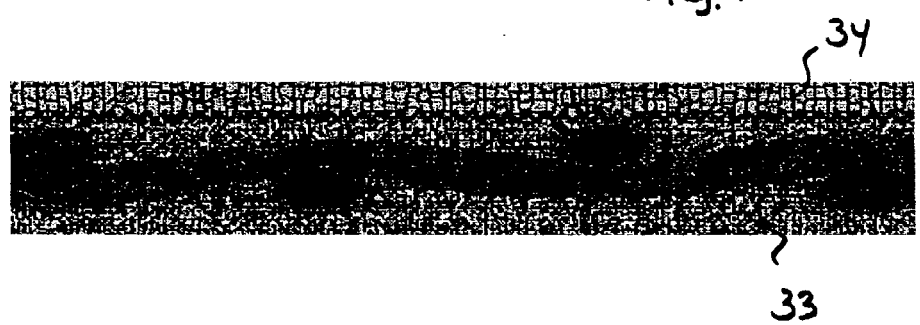
FIG. 14 is a view schematically showing a cross-section of the two layer gas diffusion element which is dendrite structured, with a dendrited mesh.

FIG. 14 shows a cross-section of the two layer gas diffusion element which is dendrite structured, with a dendrited mesh.

Figure 15:
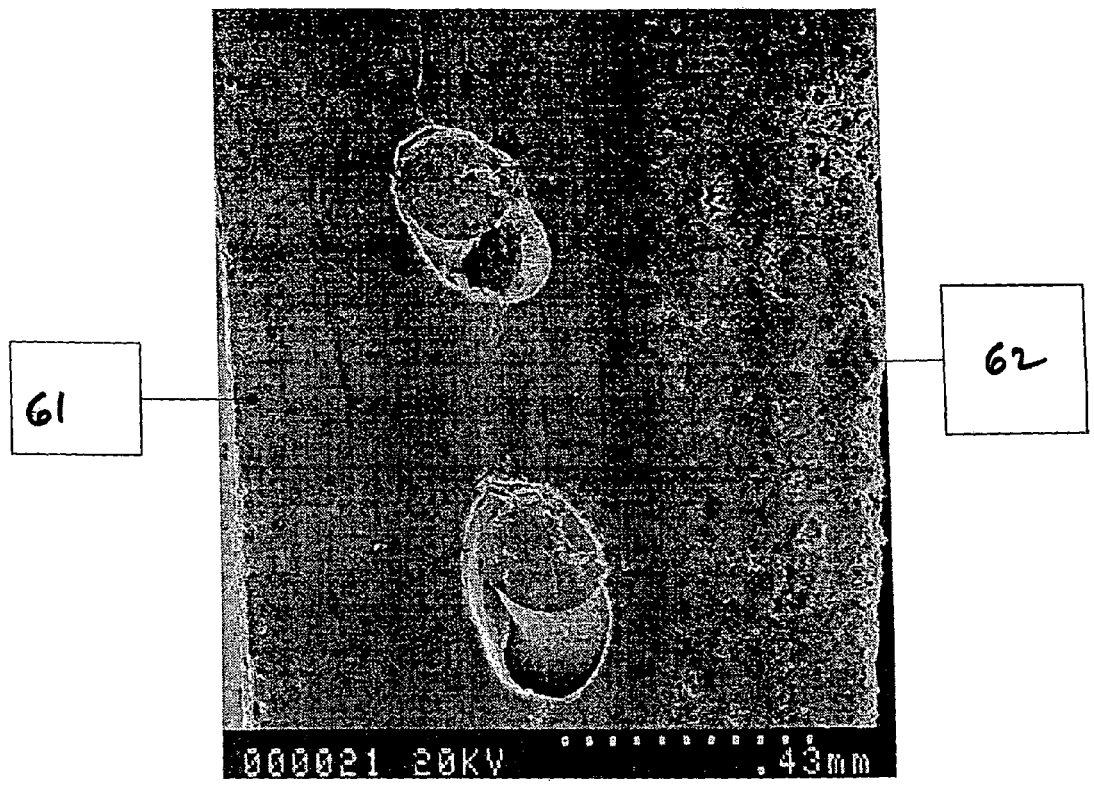
FIG. 15 is a microscope view of the two-layer gas diffusion element in accordance with the present invention.

FIG. 15 showing a microscope photograph of a cross-section of the two layer gas diffusion element with a hydrophobic layer 61 at a gas side and a hydrophilic layer 62 at an electrolyte side.

Figure 16:
FIG. 16 is a microscope view of a hydrophilic layer of the two layer gas diffusion element in accordance with the present invention.

FIG. 16 shows a microscope view of a photograph of the hydrophilic layer of the two-layer gas diffusion element with activated carbon particles 63, carbon black particles 64, pores 65, and a binder 66.

Figure 17:
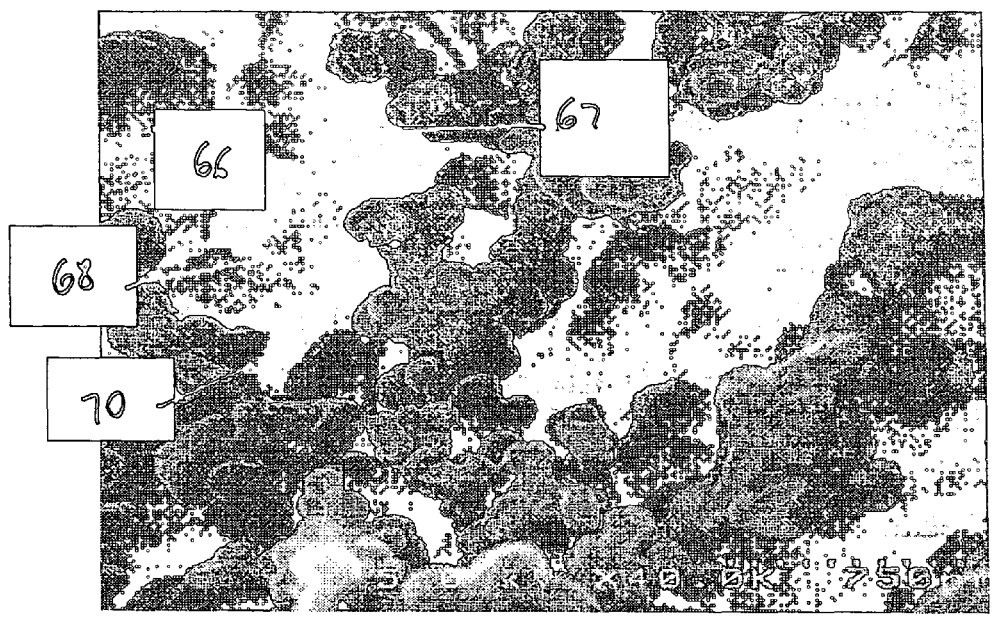
FIG. 17 is a microscope view of a hydrophobic layer of the two layer gas diffusion element in accordance with the present invention.

FIG. 17 shows a microscope view a hydrophobic layer of the two-layer gas diffusion element with activated carbon particles 67, carbon black particles 68, pores 69 and the binder 70.

Figure 18:
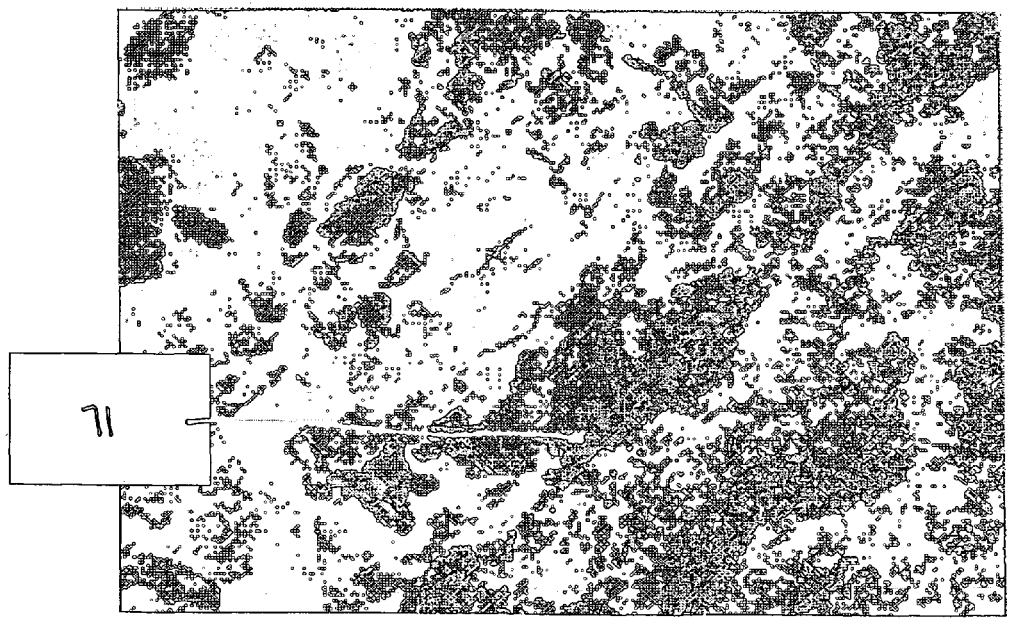
FIG. 18 is a microscope view of an interlayer of the two layer gas diffusion element in accordance with the present invention.

FIG. 18 shows a microscope view of an interlayer of the two-layer gas diffusion element, wherein an interlayer border is identified with reference numeral 71.

Figure 19:
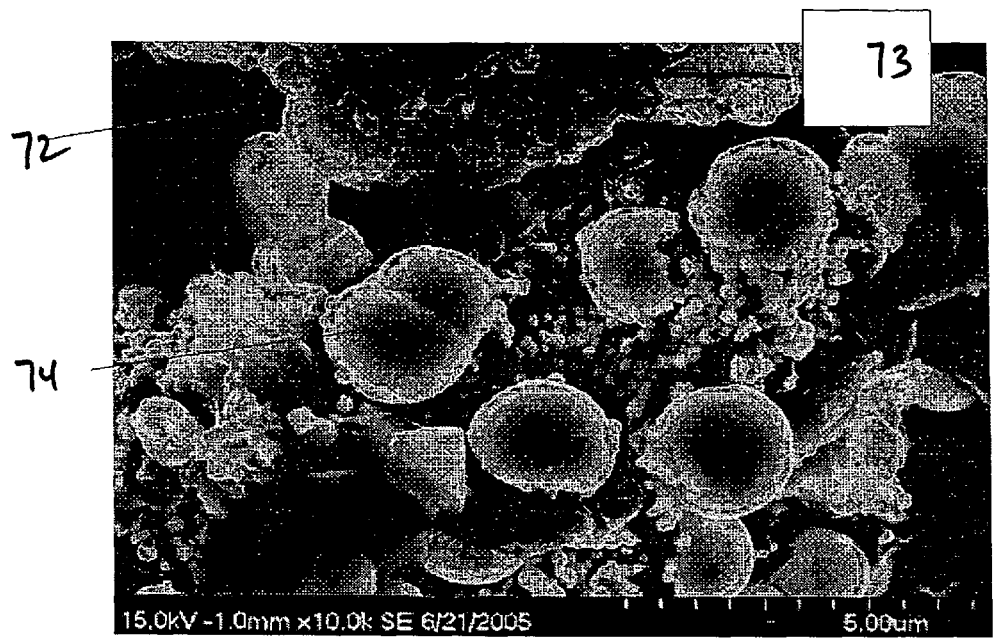
FIG. 19 is a microscope view of a catalyzed activated carbon surface of the two layer gas diffusion element in accordance with the present invention.

FIG. 19 shows a microscope view of a catalized activated carbon surface, wherein carbon black particles are identified with reference numeral 72, activated carbon particles are identified with reference numeral 73 and a catalyst is identified with reference numeral 74.

The gas diffusion element in accordance with the present invention can be formed as a three-layer gas diffusion element. It can be used in proton exchange membrane fuel cells, in alkaline fuel cells, as a catalyst carrier for hydrogen generators/convertors/reformers/afterburners, etc.

Figure 20:
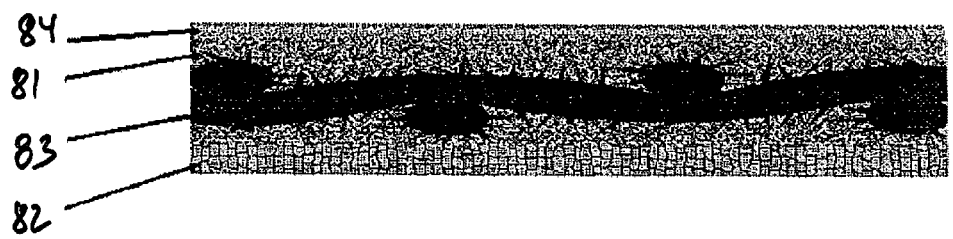
FIG. 20 is a view schematically showing a cross-section of a three layer gas diffusion element in accordance with the present invention.
Figure 21:
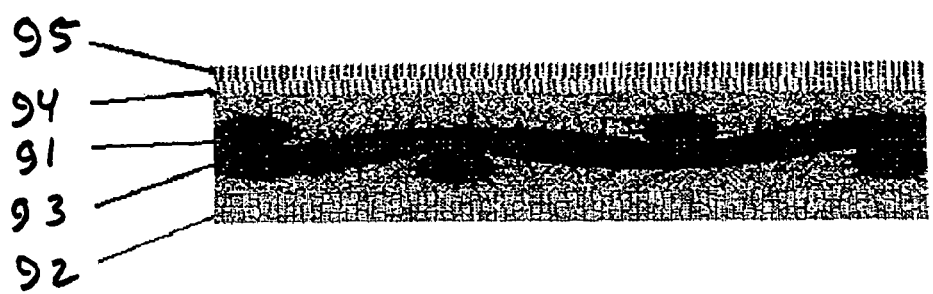
FIG. 21 is a view showing a four layer gas diffusion element in accordance with the present invention.

As shown in FIG. 20 it has a hydrophobic layer which is identified with reference numeral 81, a hydrophilic layer which is identified with reference numeral 82, it can be provided with a current collector mesh 83, and in addition at the side of the hydrophobic layer 2 it is provided with a gas selection layer 84, at a gas side. The gas selection layer 84 is configured so as to select the molecules of just required or desired sizes of gas or gasses for transmission to and through the hydrophobic layer to the electrochemical reaction zone. It is also configured to catch molecules of desired gasses onto the surface and/or to accept, absorb and distribute them into the porous surface.

The gas diffusion element in accordance with the present invention further can be formed as a four-layer gas diffusion element. Such a gas diffusion element can include a hydrophobic layer 91, a hydrophilic layer 92 at an electrolyte side, a current conductive mesh 93, a gas selection layer 94, and in addition a liquid (for example water) evaporation stopping layer 95. This layer is placed on the gas entrance side and has an optimal porous structure to prevent the water vapor evacuation from the fuel cell/liquid electrolyte to the outside or in other words from interior space to exterior and at the same time not to interfere with selection of molecules of just required or desired sizes of gas or gasses for transmission to and through the hydrophobic layer to the electrochemical reaction zone. It also catches molecules of desired size/gasses from environment space onto the surface, provides distribution of them into the porous structure, and in general increases the efficiency of the gas diffusion element. Such a gas diffusion element can be used for example in alkaline fuel cells.

The hydrophilic layer, the gas selection layer, and the water evaporation stopping layer can be composed of the same material as the hydrophobic layer, with the exception of the additional catalyst. The difference is in the porosity of the layers. If the hydrophobic layer has pore size 0.01-0.1 µm, then the hydrophilic layer can have the pore size 5-15 µm, the gas selection layer can have the pore size 25-50 µm, and the water evaporation stopping layer can have the pore size 0.1-1 µm.

It will be understood that each of the elements described above, or two or more together, may also find a useful application in other types of constructions differing from the types described above.

While the invention has been illustrated and described as embodied in gas diffusion element, method of manufacturing the same, and device using the same, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the stand-

What is claimed as new and desired to be protected by Letters Patent is set forth in the appended claims:

1. A gas diffusion element, comprising a hydrophobic layer which includes a thermoplastic material, particles embedded in the thermoplastic material so that hydrophobic layer has voids and is a porous layer configured so that water can not pass through said hydrophobic layer from its one side to its another side, while passage of gas from the other side to the one side is not interfered with, and a catalyst; and current collecting means formed as a current conductive mesh which is located completely inside said hydrophobic layer.

2. A gas diffusion element as defined in claim 1, wherein said thermoplastic material is a high-density polyethylene, and said particles are particles which provide the required porosity of the hydrophobic layer inside which said current conductive mesh is completely located, and also provide a catalytic action in the hydrophobic layer composed of the high-density polyethylene inside which said current conductive mesh is located.

3. A gas diffusion element as defined in claim 1, wherein said particles include particles which provide the required porosity and catalytic action in the hydrophobic layer inside which said current conductive mesh is completely located, and also provide electrical conductivity.

4. A gas diffusion element as defined in claim 1; and further comprising a hydrophilic layer connected with said hydrophobic layer inside which said current conductive mesh is completely located.

5. A gas diffusion element as defined in claim 1; and further comprising a gas selection layer located adjacent to said hydrophobic layer inside which said current conductive mesh is completely located, and operative for passing a desired gas and stopping a gas which is not desired to be passed.

6. A gas diffusion element as defined in claim 1; and further comprising a water evaporation stopping layer located adjacent to said hydrophobic layer inside which said current conductive mesh is completely located, and preventing evaporation of water.

7. A gas diffusion element as defined in claim 1; and further comprising a hydrophilic layer located adjacent to said hydrophobic layer inside which said current conductive mesh is completely located, having one surface facing said hydrophobic layer inside which said current conductive mesh is completely located, and another surface facing away from said hydrophobic layer; and a water evaporation stopping layer located adjacent to said another surface of said hydrophilic layer.

8. A gas diffusion element as defined in claim 1, wherein said hydrophobic layer is an extruded layer, so that the gas diffusion element is an extruded element.

* * * * *